(12) United States Patent
Wilson

(10) Patent No.: US 9,567,126 B2
(45) Date of Patent: Feb. 14, 2017

(54) PET FOOD APPARATUS

(71) Applicant: Garrett Marvel Wilson, Alexandria, VA (US)

(72) Inventor: Garrett Marvel Wilson, Alexandria, VA (US)

( * ) Notice: Subject to any disclaimer, the term of this patent is extended or adjusted under 35 U.S.C. 154(b) by 340 days.

(21) Appl. No.: 14/337,270

(22) Filed: Jul. 22, 2014

(65) Prior Publication Data
US 2016/0023793 A1   Jan. 28, 2016

(51) Int. Cl.
*A01K 5/02*      (2006.01)
*B65B 69/00*    (2006.01)

(52) U.S. Cl.
CPC .............. *B65B 69/00* (2013.01); *A01K 5/0291* (2013.01)

(58) Field of Classification Search
CPC . A01K 5/0114; A01K 5/0291; B65B 69/0025; B65B 69/0033
USPC ........... 119/51.02, 51.11, 51.12; 30/420–422
See application file for complete search history.

(56) References Cited

U.S. PATENT DOCUMENTS

| | | | |
|---|---|---|---|
| 3,720,186 A | 3/1973 | O'Rourke | |
| 4,077,360 A | 3/1978 | Figlia | |
| 4,249,483 A | 2/1981 | Sobky | |
| 4,969,557 A * | 11/1990 | Oka | ................... G03G 15/0882 141/364 |
| 2008/0216955 A1* | 9/2008 | Neeper | ............... B29C 63/0013 156/714 |
| 2012/0060761 A1 | 3/2012 | Laro | |
| 2013/0247829 A1 | 9/2013 | Taneja et al. | |

FOREIGN PATENT DOCUMENTS

WO    WO2012001422 A1    1/2012

OTHER PUBLICATIONS

Author: Unknown, Title: Soda Can Opener, Item: screen shot from a video (https://www.youtube.com/watch?v=itvLRvkYihg&feature=youtu.be&noredirect=1), Publisher: Unknown.
Author: IMADA, Incorporated; Title: Peel Test Application, Item: screen shots from http://www.imada.com/peel-testers/index.shtm, Publisher: IMADA, Incorporated 3100 Dundee Rd., Suite 707, Northbrook, IL 60062.

* cited by examiner

*Primary Examiner* — Danielle Clerkley

(57) ABSTRACT

A pet food lid removal system is described including a clamp, a drive mechanism, and a support structure that is capable of removing a lid by rotatably moving across it. A pet food lid removal method is also described.

20 Claims, 12 Drawing Sheets

PET FOOD APPARATUS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

The present application relates to an apparatus for opening food containers in order to feed a pet.

BACKGROUND

There have been a number of inventions with respect to automated and timed dispensing of pet food for pets like dogs and cats, as often pet owners need to feed their pets in situations where it is inconvenient/impossible, such as when they are away on a business trip, for them to do so manually.

Unfortunately, Unfortunately, the majority of those inventions only work well only for dispensing dry pet food. However, a large percent of pet owners and/or their pets prefer wet food since dry food contains very little moisture, which can lead to dehydration, dental problems, and jaw health issues in pets.

Almost all current inventions on market, which dispense wet food require the pet owner to open hermetically sealed commercially available pet food cans and load their contents into various compartments of an automated dispenser hours or days in advance of when the food will be actually dispensed to pets. For example, application US 20080289580 A1, S. Krishnamurthy, has pie shaped compartments into which up six servings of food are loaded prior to the device being potentially washed and reloaded. The instant the food is exposed to air its quality begins to deteriorate and may become unsafe for pet consumption over the next few hours, as exposed wet food is susceptible to bacterial contamination. Also open food attracts invertebrate pests, for example spiders, ants, cockroaches, flies, pill bugs, etc., which can infest food directly and lay eggs in it, and indirectly infest food with their larvae. Finally, open food could also attract mice, ants and create contamination problems in homes or apartment buildings where pets and pet owners reside.

To overcome the limitations of pre-dispensing food, others have reverted to opening up cans directly at the time of use. For example, in U.S. Pat. No. 4,077,360, Anthony G. Figlia, the apparatus created is essentially reconfigured standard can opener that opens a can of food and then sends the can down a chute to the waiting pet. Not only is a can of pet food typically not designed to be directly eaten from, due to its depth and vertical side walls, but the sharp edges, produced using a standard can opener could tear a pet's tongue or skin around the pet's mouth and hence an opened food can is not safe for pets to eat out of.

At the extreme end of design, there is an application such as US 20130247829 A1, Taneja et al, which added a robotic arm to pour out the food rather than let the pet eat from an opened food can.

Therefore, there continues to be a need to be able to safely open up pre-packaged hermetically sealed pet food, when needed, without having to resort to robotic arms to do so.

SUMMARY

In order to overcome the deficiencies in the prior art, systems and methods are described herein.

One aspect of the claimed invention involves a lid removal system configured to constrain the free end of the lid in a clamp and have the clamp receive a torque sufficient to overcome the force required to separate the lid from a container and to move rotatably from one end of the lid to the other.

Another aspect involves a lid removal system configured to constrain the free end of the lid in a clamp and have the clamp move rotatably across the lid while the lid wraps around the clamp.

A further aspect involves a method comprising activating a drive mechanism to apply a torque to clamp that is sufficient to overcome the force required to separate the lid from a container and to cause the clamp to rotate across the lid while the lid simultaneously wraps around the clamp.

These and other aspects described herein present in the claims result in features and/or can provide advantages over current technology.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

DRAWING REFERENCE NUMBERS

| | |
|---|---|
| 100 | Lid |
| 102 | Free End |
| 104 | Point of Contact |
| 106 | Separate Section |
| 110 | Adhesive |
| 114 | Point of Contact |
| 120 | Container |
| 122 | Lip |
| 130 | Food |
| 140 | Clamp |
| 140' | Clamp |
| 140-1 | Clamp |
| 140-2 | Clamp |
| 140-3 | Clamp |
| 142 | Slot |
| 150 | Rotation |
| 200 | Sleeve |
| 210 | Clamp |
| 212 | Slot |
| 214 | Stop |
| 216 | Recess |
| 220 | Spring |
| 230 | Plunger |
| 232 | Tip |
| 250 | Rotation |
| 250-1 | Rotation |
| 260 | Drag Mechanism |
| 262 | Pivot |
| 264 | Rotation |
| 270 | Support |
| 300 | Direction |
| 310 | Direction |
| 320 | Constraint |
| 322 | Top of Constraint |
| 330 | Constraint |
| 332 | Top of Constraint |
| 340 | Displacement |
| 350 | Support |
| 400 | Spring |
| 400-1 | Spring |
| 400-2 | Spring |
| 400-3 | Spring |
| 400-4 | Broken Spring |
| 400-5 | Broken Spring |
| 410 | Zone |
| 420 | Force |
| 420-1 | Force |
| 420-2 | Force |
| 500 | Clamp |
| 502 | Slot |
| 510 | Zone |
| 520 | Direction |
| 600 | Clamp |
| 602 | Slot |
| 604 | Edge |
| 606 | Edge |
| 608 | Radius |
| 610 | Zone |
| 700 | Distance |
| 705 | Natural Bend |
| 710 | Zone |
| 720 | Force |
| 720-1 | Force |
| 720-2 | Force |
| 720-1' | Force |
| 720-2' | Force |
| 720-5 | Angle of Pull |
| 800 | Drive Interconnect |
| 810 | Axel |
| 820 | Drive Interconnect |
| 825 | Spring |
| 827 | Spring Stop |
| 830 | Rotation |
| 840 | Ratchet Mechanism |
| 845 | Spring |
| 850 | Actuator |
| 852 | Switch |
| 860 | Counter Torque |
| 900 | Assembly |
| 910 | Holder |
| 911 | Holder |
| 912 | Clip |
| 914 | Retainer |
| 915 | Retainer |
| 916 | Extension |
| 918 | Cover |
| 920 | Clamp |
| 921 | Direction |
| 922 | Fixed Half |
| 924 | Hinged Half |
| 925 | Pin |
| 926 | Part of the Clamp |
| 930 | Drive Mechanism |
| 932 | Connector |
| 934 | Pin |
| 935 | Slot |
| 936 | Surface |
| 937 | Exterior |
| 940 | Support Structure |
| 950 | Cover |
| 951 | Window |
| 954 | Wall |
| 956 | Switch |
| 958 | Shield |

DETAILED DESCRIPTION

The instant devices and approach provide a way to safely open up, at the time use, a pre-packaged hermetically sealed pet food container with a peelable lid.

By having a rotatable clamping device that attaches to the free end of a peelable lid that is then rotated, the lid will be removed while the rotatable clamp rolls from one end of the food packaging to the other.

Figure 1A:
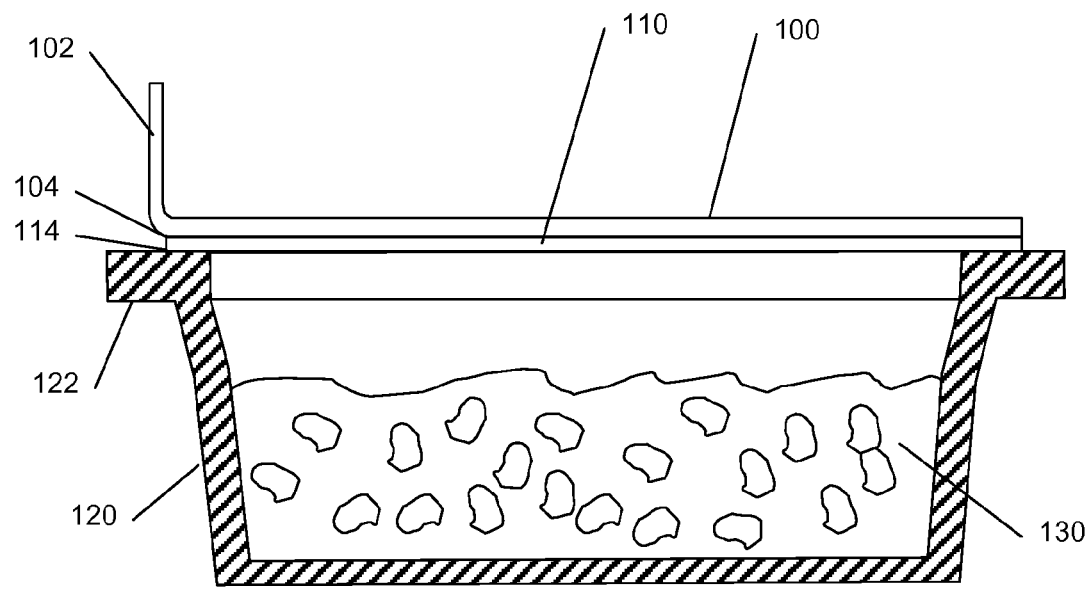
FIG. 1A shows a representative a cross section view of pre-packaged pet food with a peelable lid and 1B shows in simplified form the inclusion of a rotatable clamp.

FIG. 1 shows in simplified form a representative cross section view of a pre-packaged hermetically sealed pet food with peelable lid. It shows a peelable lid 100, which has a free end 102 and a contact point 104 with an adhesive 110. The adhesive 110 is used to create a hermetic seal by bonding to both the lid 100, along the contact point 104, and a container 120, along a contact point 114 in order to protect food 130. The lid is peeled off the container by breaking at least one of the contact points 104, 114 or failure/breaking of the actual adhesive itself. It is immaterial to the present understanding as to which one breaks, it is only important to understand that there is a breaking, which allows the lid to be separated from the container. Further it should be understood that the adhesive 110 is not meant to represent any particular type of adhesive in particular and is merely representative of bonding area between the lid and container that may include a physical adhesive; be a chemical, heat, or ultra sonic bond; or simply a mechanical locking mechanism, compression fit, or weakened material area designed to fail (e.g. perforated region) to name a few. Similarly, it is immaterial to the present understanding as to the exact nature of the adhesive, it is only important to understand that the lid and the container are not a single unit and that it is possible to separate one from the other, without causing either the lid or the container to fail/break, except in areas intentionally designed to fail (e.g. a perforated region).

By grasping the free end of the lid, which may be a pull-tab, with a clamp, and then simply rotating the clamp, it is possible to remove the lid.

Figure 1B:
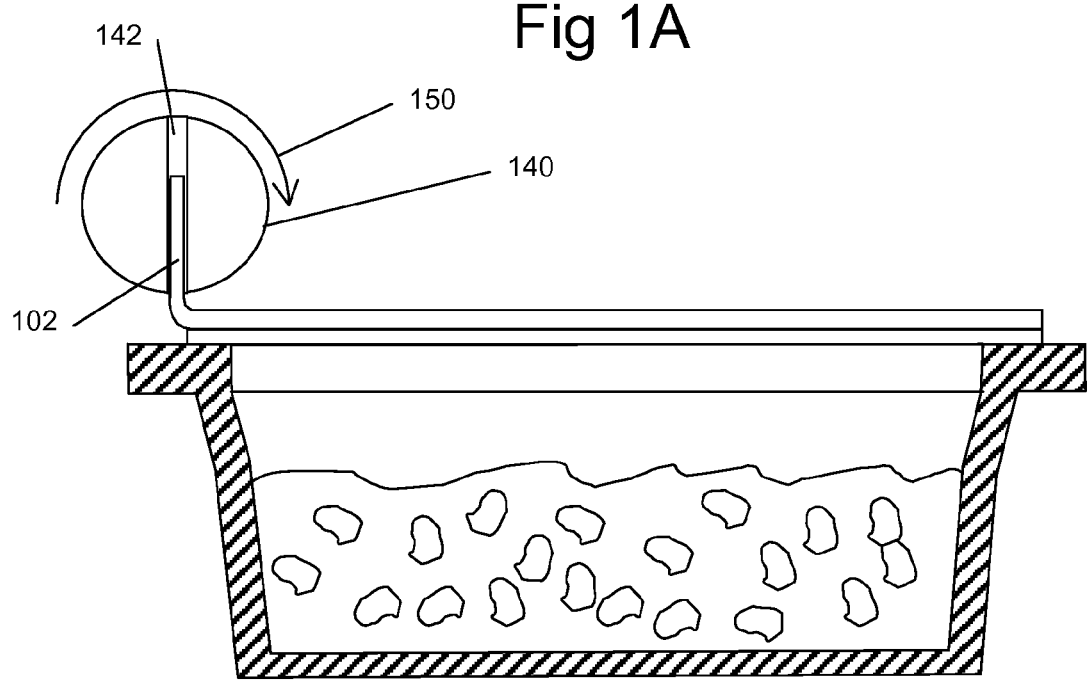

FIG. 1B shows in simplified form, the inclusion of a rotatable clamp 140 attached to the free end 102. For the purpose of providing an initial understanding, the rotatable clamp 140 is represented as cylinder (projecting into the paper) with a slot 142, into which the free end 102 is inserted. It is assumed that the frictional forces between the free end 102 and the clamp 140 are sufficient such that when the clamp 140 is rotated 150 that the free end 102 will remain within the clamp 140.

Aside from simple friction, the free end 102 could be constrained within the clamp 140 by one or more of the following: by the addition of an adhesive or other bonding agent (not shown), crimping or otherwise causing the clamp (e.g. tightening the clamp) to have a press fit with the lid, piercing the lid, or the use of a tortured path rather than just a straight slot. The important aspect being the free end remain within the clamp during rotation, not the particular type of restraint that may be used.

Figure 2A:
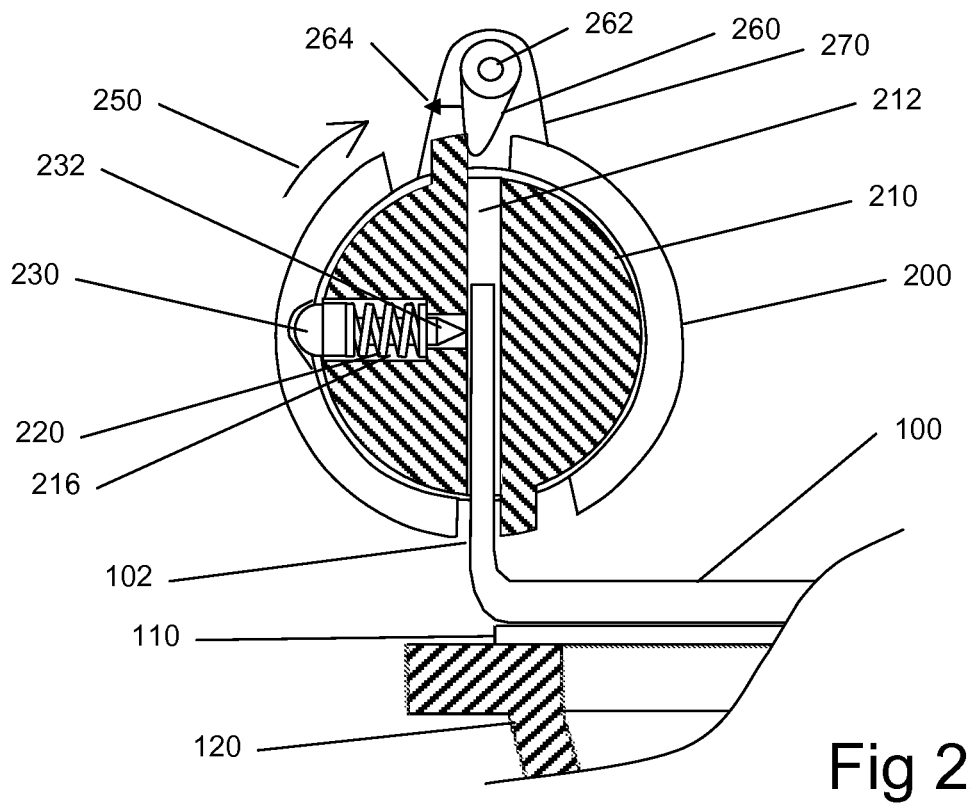
FIGS. 2A and 2B shows, in simplified form, a motion actuated piercing mechanism.
Figure 2B:
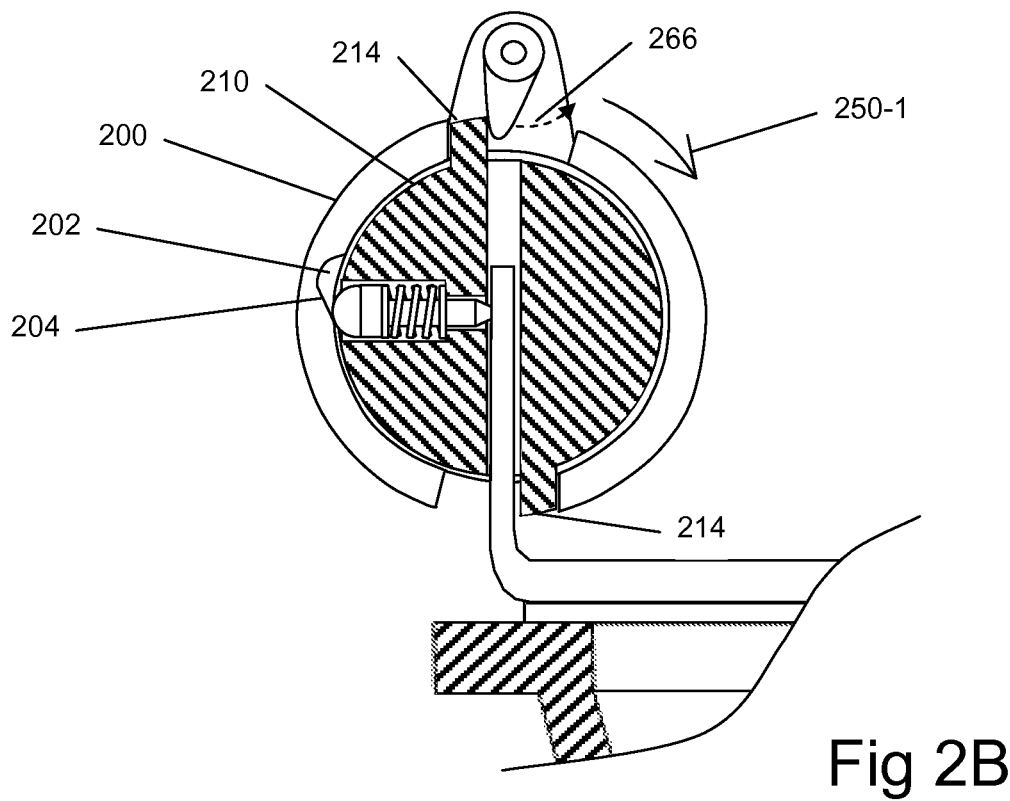

Additionally, motion actuated clamping and/or piercing actions are also anticipated. FIGS. 2A and 2B shows in simplified form a motion actuated piercing mechanism that by simply changing the tip of the plunger would be easily understood by those knowledgeable in the art to also be capable of being a motion actuated clamping mechanism. Specifically, FIGS. 2A and 2B shows a rotatable sleeve 200 and clamp 210. The clamp 210 (shown in cross section) is designed to capture the free end 102 of lid 100 in slot 212 and clamp 210 is capable of moving rotatably within the sleeve 200 and has rotation stops 214. The recess 216, of the clamp 210, is configured to allow a spring 220 and a plunger 230, having a tip 232, to be inserted into it. The spring 230 is configured such that when the sleeve 200 in not experiencing a rotation force causing it to rotate 250 that it will force the plunger into recess 202 of the sleeve 200 such that there is an unobstructed path to insert the free end 102 into slot 212 of clamp 210, as shown in FIG. 2A.

However, when the sleeve 200 is experiencing a rotation force causing it to rotate 250 then the angled surface 204 of the recess 202 will force the plunger 230 into the lid 100, causing a tip 232 to piece the free end 102 of the lid 100. While it is possible that the friction between slot 212 and the free end 102 may be sufficient to prevent clamp 200 from rotating when the sleeve 200 begins to rotate in direction 250, a drag mechanism 260, which has a pivot point 262, exerts a force in direction 264 and is mounted on a support 270, is shown. It should be noted that the drag mechanism 260, in addition to preventing initial rotation of the clamp 200 also advantageously assists in alignment of the clamp 200 with the free end 102.

As the sleeve 200 rotates 250, eventually it will contact with the rotation stops 214, as represented in FIG. 2B. Continued rotation 250-1, will cause the drag force 262 to be exceeded and the drag mechanism 260 will rotate 264 out of the way, and the clamp 210 and the sleeve will rotate together as unit with the lid captured and pierced within slot 212.

The motion actuated piercing mechanism represented in FIGS. 2A and 2B shown only one example in simplified form (without drive mechanisms and the necessary supporting structure, other than the drag mechanism support 270) the dynamics involved in creating the motion actuated clamping and/or piercing action. It should be recognized by those knowledgeable in the art that other mechanical means could be used to accomplish a similar result. However, it bears repeating that the important aspect being the free end remain within the clamp during rotation, not the particular type of restraint that may be used and whether or not it is motion actuated.

If the container is constrained and the clamp is allowed to move rotatably, as well as at least in a direction that is from the free end of the lid to its opposite end, end, then as the clamp rotates it will remove lid while it simultaneously moves across the container.

Figure 3A:
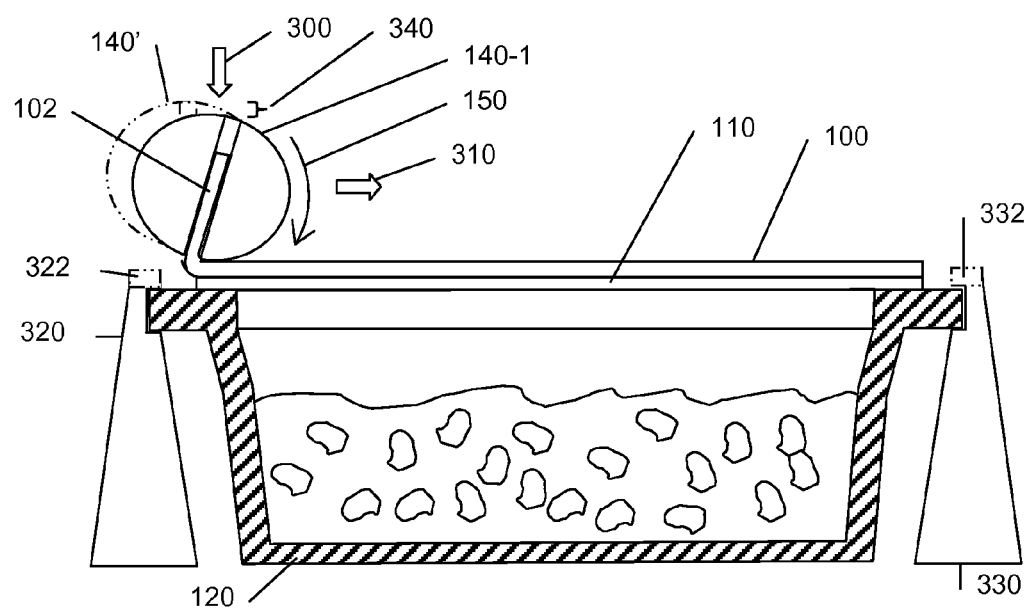
FIGS. 3A and 3B shows in simplified form, a clamp with various degrees of freedom.

FIG. 3A shows in simplified form, where the container is completely constrained but that the clamp 140-1 has at least two degrees of freedom represented by two orthogonal directions 300, 310 where one direction 310 is from the free end 102 of the lid 100 to the opposite end of the lid and the other direction 300 is towards (or away from) the container 120, specifically towards (or away from) the container's contact point 114 to which lid attachment occurs. The clamp 140-1 is able to move in both direction 300, 310 in reaction to clamp 140-1 being rotated 150 (or counter rotated).

The container 120 is represented as being constrained such that it cannot move in either orthogonal direction 300, 310 by two constraints 320 and 330, which are represented as "U" channels. The total number of constraints as well at the particular configuration of the constraints is unimportant and need not be an actual physical constraint. To emphasize the point, in FIG. 3A the tops of both constraints 322 and 332 are represented by phantom lines indicating that the tops of the constraints need not be physically present, if for example, the weight of the clamp (or other applied force in direction 300 towards the container, e.g. the clamp is spring loaded) is sufficient to constrain the container. Alternatively, one or both of the tops of constraints 322, 332 could move slidably to allow for ease of insertion of the container into the constraints or one or both of the tops of constraints 322, 332 could be missing and the container could be glued into one or both of the constraints 320, 330 using an adhesive (not shown).

The important aspect being the container cannot move in the directions in which the clamp is able to move due to its one or more degrees of freedom, not the particular type or number of constraints that may be used.

Figure 3B:
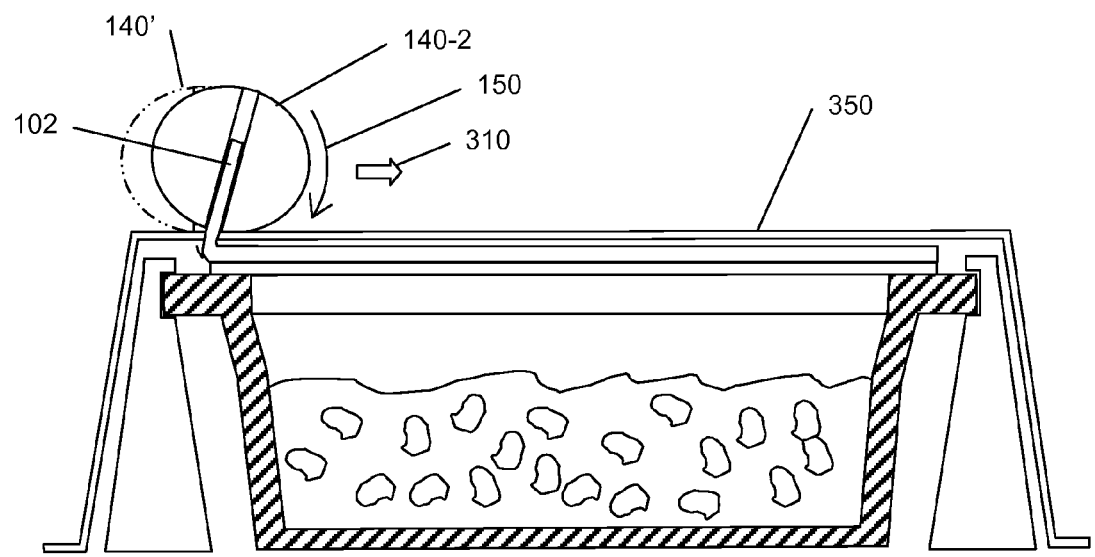

FIG. 3B shows almost an identical configuration to FIG. 3A; however, a support 350 has been added and as a result rather than having two degrees of freedom, clamp 140-2 only has one degree of freedom represented by direction 310 from the free end 102 of the lid 100 to the opposite end of the lid and will move in this direction 310 in reaction to clamp 140-2 being rotated 150 towards the far end of the lid (or counter rotated). Similar to the discussion related to constraints 320, 330, while the support 350 is shown as a shelf, it could easily have been a channel or similar configuration. The important aspect being the clamp cannot move in direction 300 that is towards the container 120, not the particular type, or number of support that may be used. It is also worth noting that the support 350, as shown, does not cause any interference between the lid and the rotatable clamp and, as such, does not represent an intervening contact point.

In both FIG. 3A and FIG. 3B the starting position of the clamp prior to being rotated 150 (or counter rotated) is represented by clamp 140' represented in phantom lines. The clamps in solid lines 140-1, 140-2 specifically represent the case where the clamps have been specifically rotated 150 and all the slack has been taken out of the free end 102 and the pealing process is about to be initiated. The difference between the two clamp positions 140-1, 140-2 is that in FIG. 3A the clamp 140-1 has also undergone a displacement 340 in direction 300 towards the container 120 such that the clamp 140-1 is now sitting on top of the lid 100. It should be noted that by rotating in the opposite direction, it is equally possible to get to the situation where all the slack has been taken out of the free end 102 and the pealing process is about to be initiated. However, the clamp will initially move in the direction opposite of 310 until such time as all the slack has been taken up out of the free end 102 and then any further counter rotation will cause the clamp to reverse direction and move in direction 310 that is also from the free end 102 of the lid 100 to its opposite end.

Figure 4:
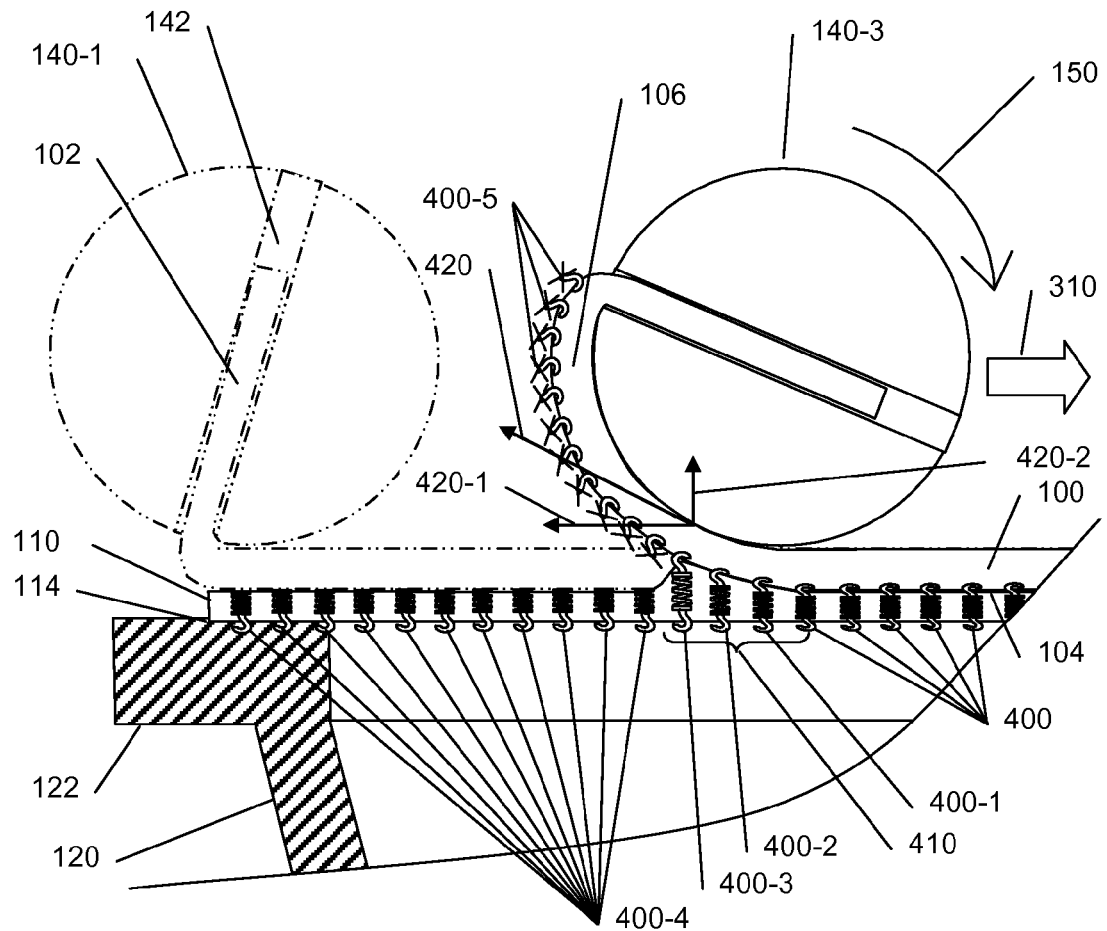
FIG. 4 shows, in simplified form, a model of the peeling process.

As a further guide to understanding, FIG. 4 shows, in simplified form, a model of the peeling process. As the clamp 104-1 rotates 150, with the free end 102 of lid 110 captured inside it, the clamp moves across the lid, while simultaneously wrapping the separated section 106 of the lid around the clamp. The clamp 140-3 is shown at an intermediate point in removal of the lid. The forces keeping the lid 100, the adhesive 110, and the container 120 together are modeled by a series of springs 400 that are attached between the lid 100 and the container 120 and the area actively separating is represented by a separation zone 410. As the clamp 140-3 rotates 150, within the zone 410 of separation, it causes a force 420 tangential to the clamp to be transmitted to the lid. The tangential force 420 can be separated into two perpendicular forces: one force 420-1 is along the lid and the other component of force 420-2 is pulling upwards against the bond between the lid 100, the adhesive 110, and the container 120. For simplicity of understanding, the adhesive 110 is shown as experiencing deformation within the zone 410 of separation; however; it could also have been the lid 100 or the container 120 (or a combination of any of them) that undergoes deformation.

In this example, three springs 400-1, 400-2, and 400-3 are shown within the zone 410 of separation and experiencing varying degrees of stretching and a fourth spring 400 is shown on the very edge of the zone 410 and is not represented as currently being stretched. In this model, the more springs involved in the separation zone and the farther they are stretched then the greater the component of force 420-2 needs to be in order to cause separation. The spring 400-3 is represented as being stretched to its elastic limit. Any additional stretching will cause the spring to fail. Beyond the zone 410 of separation the lid 100 is represented as separated from the adhesive layer, along their point of contact 104, with a component of broken spring 400-5 attached all along the lids separated section 106 and the adhesive 110 and container are shown with broken spring 400-4, maintaining the bond between the two of them along their point of contact 114.

It is worth noting that it could just as easily have been a separation at the point of contact 104 between the adhesive 110 and the lid 100 or a failure of the adhesive 110 itself. The important aspect to understanding being that there will be a zone of separation and the larger the zone of separation is the more force is required to produce a separation and that the once separated the lid will wrap around the clamp as it continues to rotate and move across the container from one end to the other.

Figure 5:
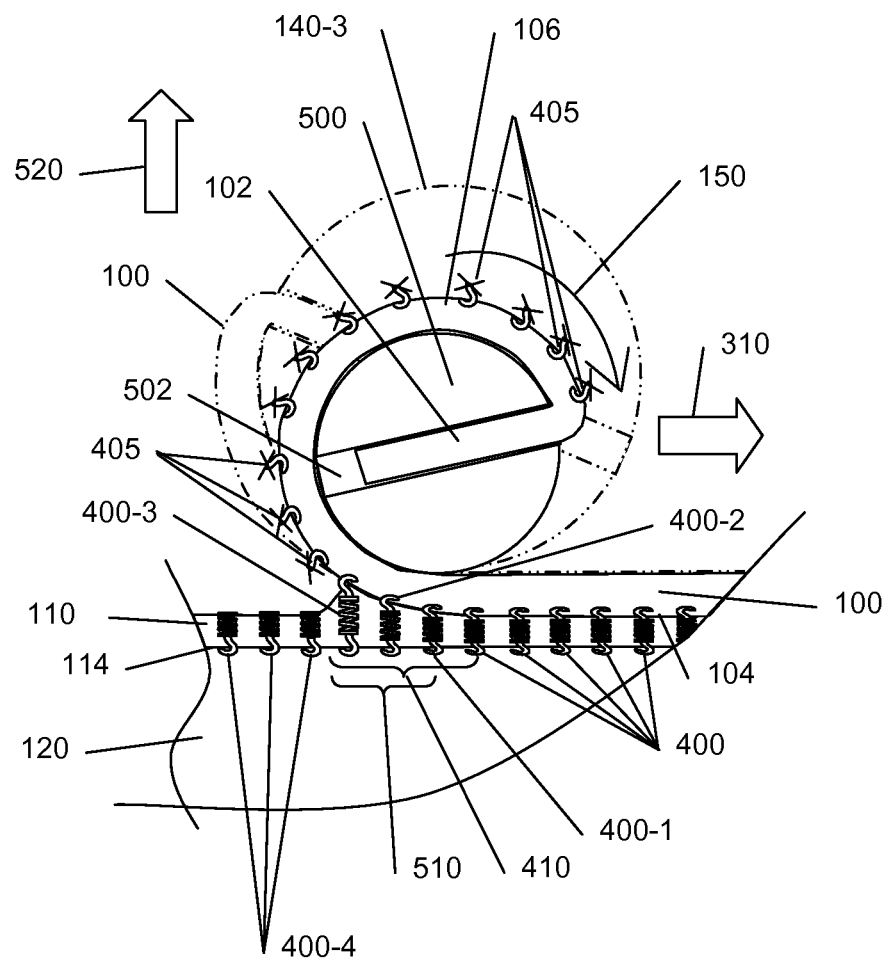
FIG. 5 shows, in simplified form, the impact of changing the size of the clamp.

FIG. 5 shows, in simplified form, the impact of changing the size of the clamp, and specifically models how decreasing the size of the clamp decreases the size of the zone of separation and requires a smaller force to separate the lid from the container. Likewise, although not shown, increasing the size of the clamp increases the force required to separate the lid from the container. Similarly, as the lid wraps at least one complete rotation around the clamp, the effective size of the clamp will be increased by the lid thickness so as the clamp gets closer to the far end lid, with more and more successive layers wrapped around it, of the force required to separate the lid from the container also increases.

In FIG. 5 represented in phantom lines is the clamp 140-3 from FIG. 4 and the corresponding the zone 410 of separation. Superimposed over those is a smaller clamp 500, which has a slot 502 that is used to trap the free end 102 of the lid 100. The clamp 500 is similarly rotating 150, which is causing it to travel in direction 310 that removes the lid and it has similarly achieved an intermediate position in removing the lid 100. The method of separation is identical to that described in relation to FIG. 4, except the smaller clamp 500 can be seen to have a smaller zone 510 of separation, which only encompasses two (rather than three) springs 400-3 and 400-2 and has a third spring 400-1 at its edge, which is in an un-stretched state. Similar to FIG. 4, the spring 400-3 in FIG. 5 is represented as being stretched to its elastic limit. As a result of the smaller zone 510 of separation there will be less force required to remove the lid.

However, as more and more layers of the lid wraps around clamp, it will begin to look more and more like clamp 140-3. Therefore, it should be noted that not only does the force required to separate the lid increase as more layers of the lid wrap around the clamp but also the clamp will move in a direction 520 that is away from the container 120 and therefore the clamp must also have a degree of freedom in a direction 520 away from the container.

Figure 6:
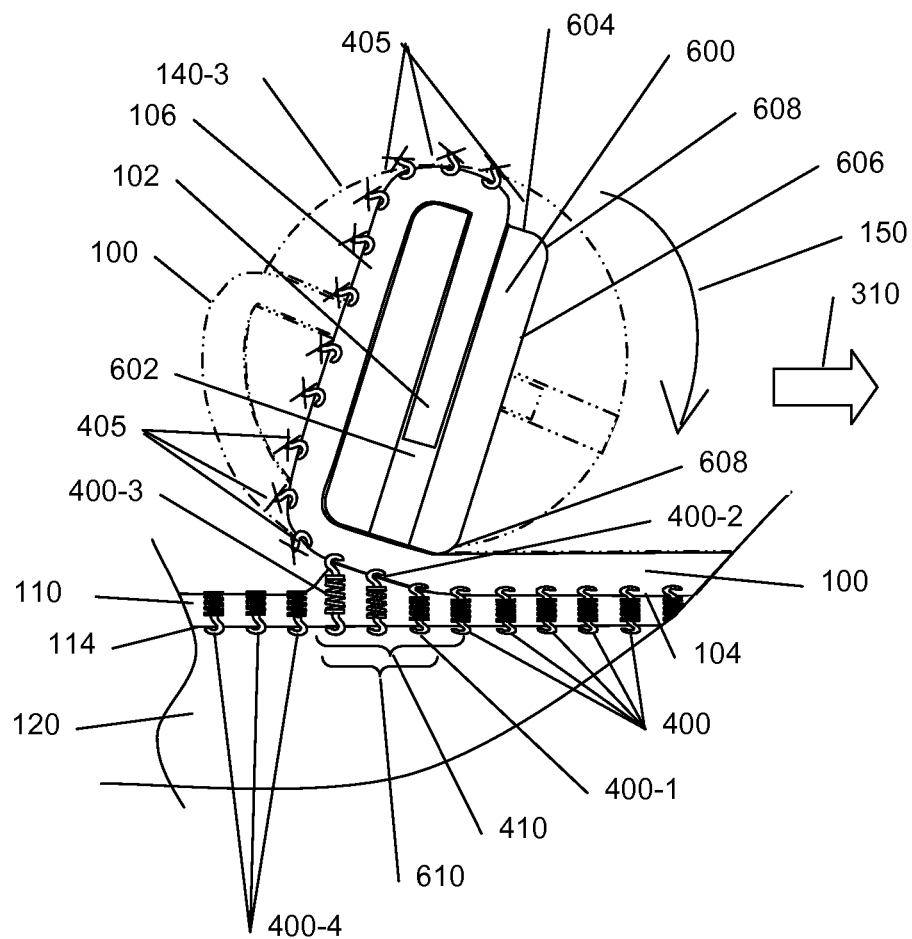
FIG. 6 shows, in simplified form, the impact of changing the shape of the clamp.

FIG. 6 shows, in simplified form, the impact of changing the shape of the clamp, and specifically models how changing the shape from a cylinder to rectangular bar. The shape of the clamp can be any shape (e.g. cylindrical, rectangular, trapezoidal, and even star shaped to name a few) as long as there is sufficient torque capable of being applied to the clamp such that it is capable of rotating. The impact of changing the shape is simply that the zone of separation will vary as the clamp moves from one end of the container to the other and the shape would be chosen as best suited to a particular, for example a star pattern might be chosen such that it matched up with perforation points in a perforated lid.

In FIG. 6 it shows in phantom lines the clamp 104-3 from FIG. 4 and the corresponding the zone 410 of separation. Superimposed over those is a rectangular bar shaped clamp 600 projected into the paper, which has a slot 602 that is used to trap the free end 102 of the lid 100. The clamp 600 has a short edge 604, long edge 606, and radiuses 608 at the corners. The clamp 600 is similarly rotating 150, which is causing it to travel in direction 310 from one end of the container 120 to the other and it has similarly achieved an intermediate position in removing the lid 100. The method of separation is similar to that described in relation to FIG. 4 and FIG. 5, except the rectangular clamp 600, will have a variable zone of separation. The zone of separation will at times be smaller than that of zone 510 of separation from FIG. 5, such as when it is rotating around the radiuses 608 at the corners, as the radius at the corners is projected as being smaller than that of clamp 500 to an intermediate value such as represented in FIG. 6 where the clamp is rolling across its short edge 604 to a zone of separation that would be larger than that of zone 410 of separation from the largest pictured cylindrical clamp 140-3, such as when the clamp 600 is rolling across its long edge 606.

It is worth noting that the clamp need not necessarily be cylindrical (or bar shaped) as represented in FIG. 4-6. In some applications it may be preferable to peel off the lid in a curving manner rather than just straight across. As long as the clamp has an additional degree of freedom that is orthogonal to direction 310 from one end of the container to the other and in a plane parallel to the lid then a clamp tapered from either front to back or back to front will cause the lid to be removed in a curved rather than a straight path.

Figure 7:
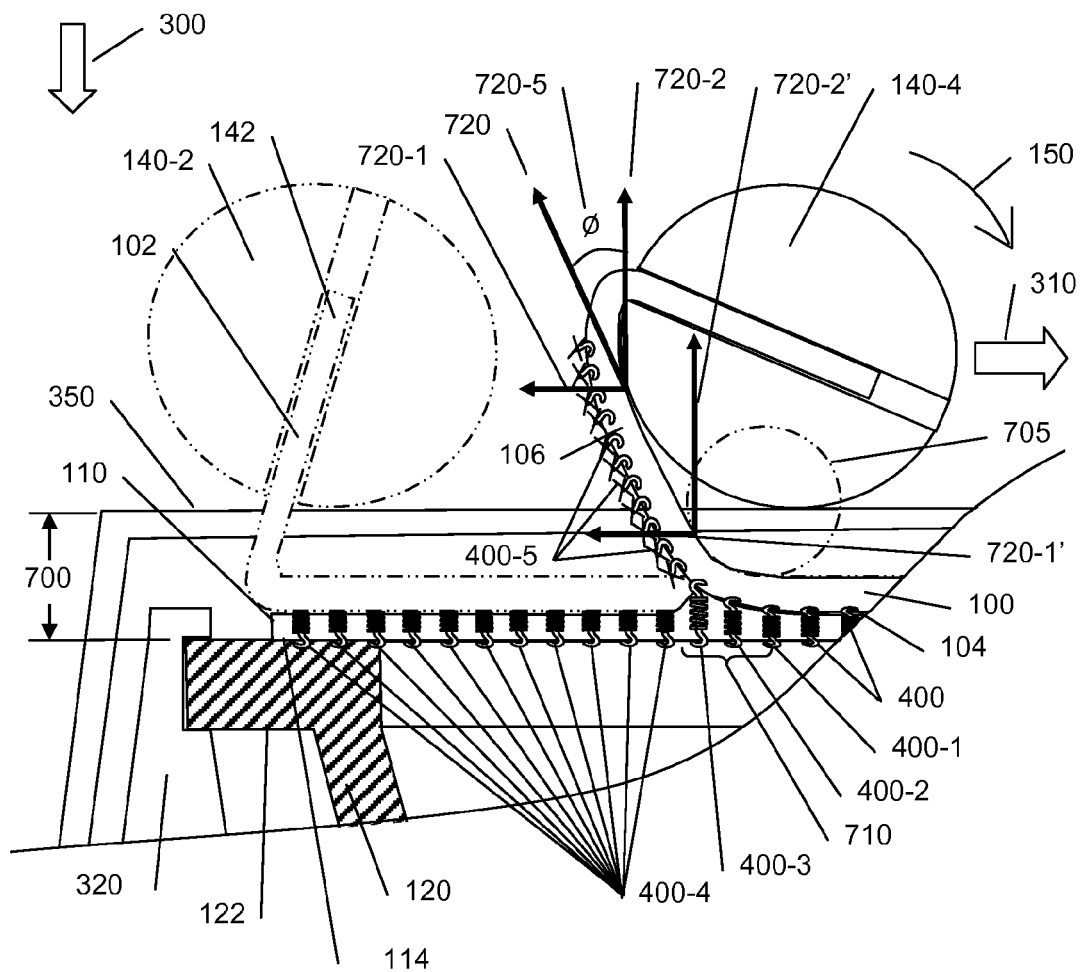
FIG. 7 shows the forces of separation involved in the situation represented in FIG. 3.

FIG. 7 shows the forces of separation involved in the situation represented in FIG. 3. In this situation, the clamp 140-2,140-4 is constrained by a support 350 such that it cannot move in the direction 300 towards the lid. As a result, the clamp 140-2,140-4 is some distance 700 above the container 120. Additionally, it is assumed that the distance 700 is sufficient such the entire length of lid 100 can wrap around the clamp 140-4, as constrained. If there is not sufficient space then the clamp needs to simply have a degree of freedom away from the container 120.

The dynamics involved in FIG. 7 are similar to that of FIGS. 4-6; however, rather than the zone of separation being predominantly a function of the shape of the clamp, in the case where the clamp is constrained above the container, it is predominantly a function of the natural bend 705 of the lid's seal to the container.

As the clamp 140-2 rotates 150 above the lid, due to the support 350, with the free end 102 of lid 110 captured inside it, the clamp still moves in direction 310 across the lid 100 (but above it), while simultaneously wrapping the separated section 106 of the lid around the clamp.

The clamp 140-4 is shown at an intermediate point in removing the lid. Just as in FIGS. 4-6, in FIG. 7, the forces keeping the lid 100, the adhesive 110, and the container 120 together are modeled by a series of springs 400 that are attached between the lid 100 and the container 120 and the area actively separating is represented by a separation zone. As the clamp 140-4 rotates 150, within the zone 710 of separation, it similarly causes a force 720 tangential to the clamp to be transmitted to the lid. However, in this case it causes a pulling force on the separated portion 106 of the lid 100 that is then transmitted to zone of separation 710. The tangential force 720 can be separated into two perpendicular forces: one force 720-1,720-1' is along the lid and the other component of force 720-2,720-2' is pulling upwards against the bond between the lid 100, the adhesive 110, and the container 120. Similar to FIGS. 4-6, in FIG. 7 for ease understanding, the adhesive 110 is shown as experiencing deformation within the zone 710 of separation; however; as previously discussed, it could also have been the lid 100 or the container 120 (or a combination of any of them) that undergoes deformation.

In this example, three springs 400-1,400-2, and 400-3 are shown within the zone 710 of separation and experiencing varying degrees of stretching. The third spring 400-3 is shown on the very edge of the zone 710 and is not represented as currently being stretched. As before, the more springs involved in the separation zone and the farther they are stretched then the greater the component of force 720-2,720-2' needs to be in order to cause separation. The spring 400-3 is represented as being stretched to its elastic limit. Any additional stretching will cause the spring to fail. Beyond the zone 710 of separation the lid 100 is represented as separated from the adhesive layer, along their point of contact 104, with a component of broken spring 400-5 attached all along the lids separated section 106 and the adhesive 110 and container are shown with broken spring 400-4, maintaining the bond between the two of them along their point of contact 114.

The angle of pull 720-5 is label as the angle Ø and this angle is largely determined by the natural bend 705 of the lid's seal to the container, assuming the container 120 is rigid and supported by its constraints 320, 330, (note: only one constraint 320 is shown in FIG. 7, the other constraint 330 can be seen in FIG. 3B). Therefore, the angle of pull 720-5 is largely independent of the clamp shape and will in general be consistent along the entire length of the lid and unlike FIGS. 4-6, where the zone of separation changes as more and more layers of the lid wrap around the clamp. In the scenario represented by FIG. 7, the zone of separation will in general be constant across the entire lid.

Up to this point, what has been illustrated, in simplified form, are the mechanics behind the process of a rotatable clamp removing a peelable lid. However, in order for the lid to be removed by having the clamp, with the free end of a lid constrained, move rotatably from the free end of the lid to the opposite end then there must be a drive mechanism coupled to a support structure that is capable of providing sufficient torque to overcome the force required to separate the lid from the container, such that the clamp is able to move rotatably across the lid.

Figure 8:
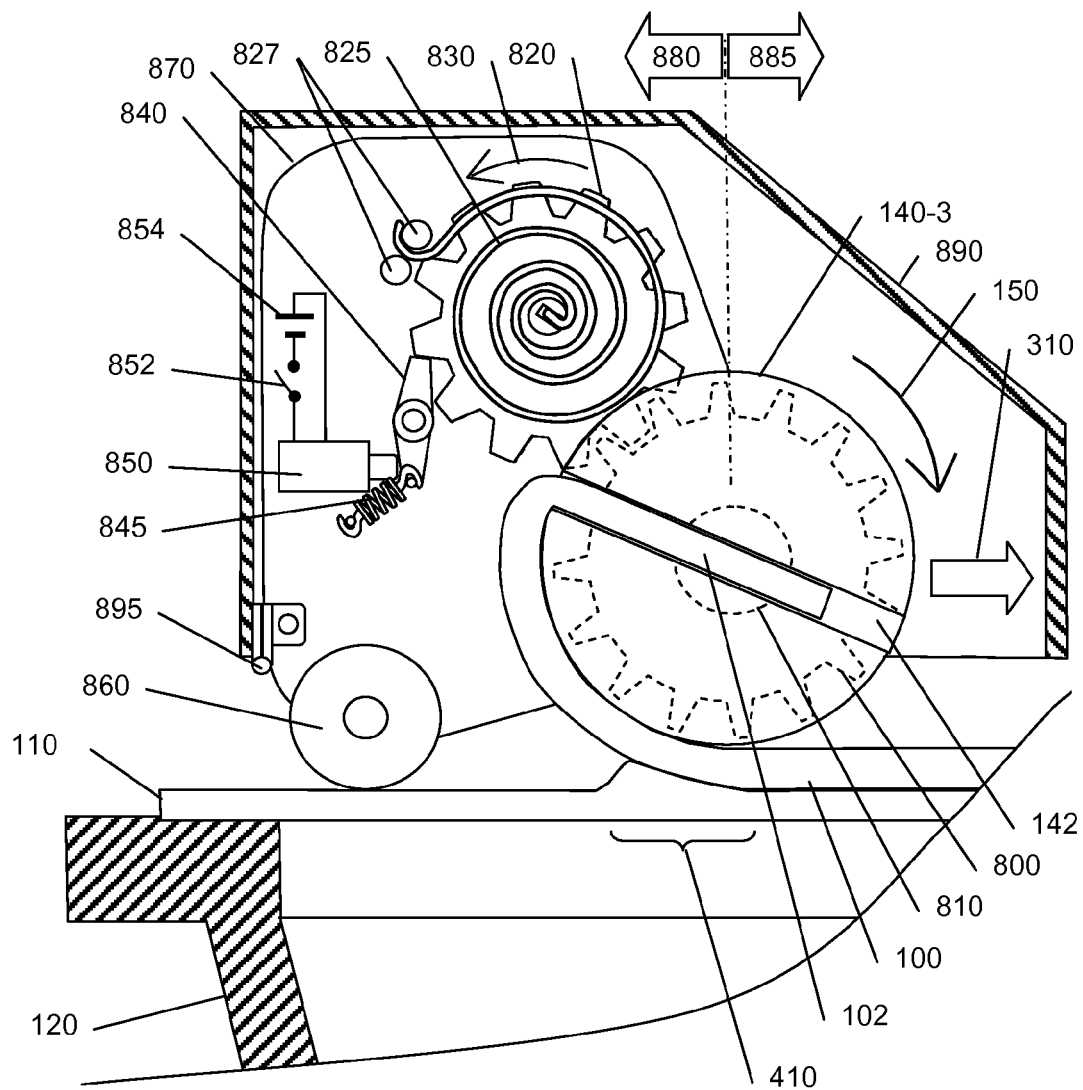
FIG. 8 shows is simple form the inclusion of a support structure and drive mechanism.

FIG. 8 shows is simple form the inclusion of a support structure and drive mechanism configured to produce sufficient torque such that the clamp, with the free end of the lid constrained, is able to move rotatably from the free end of the lid to the opposite end and thereby remove the lid.

FIG. 8 shows the clamp 140-3 with the free end 102 of the lid 100 constrained in the slot 142 and rotating 150 about a central axel 810 towards the opposite end of the lid 100. The rotation 150 of clamp 140-3 is produced by a torque being applied to the clamp through a drive interconnect 800, which is coupled to a drive mechanism comprised of a drive interconnect 820, spring 825, and spring stops 827. As the spring 825 uncoils it causes the drive interconnect 820 to rotate 830 and apply a torque to the clamp 140-3 through the clamps drive interconnect 800. When the torque applied is sufficient to overcome the force required to separate the lid then the clamp 140-3 will rotate 150 and move in the direction 310 of the opposite end of the lid, while the lid 100 simultaneously wraps around the clamp.

The drive mechanism in this particular case is able to store energy in its spring 825 by the clamp 140-3 being counter rotated, while the spring 845 loaded ratchet mechanism 840 prevents the energy from being released until the switch 852 is closed providing a current from the power supply 854 to cause the actuator 850 to push against the ratchet mechanism 840 and then spring 825 uncoils. [Note: In this case, in addition to the ratchet mechanism allowing energy to be stored, the use of a ratchet mechanism (which could have also been coupled to the clamp) allows the clamp to be counter rotated in a direction opposite of the drive mechanism and can advantageously be used to rotate the clamp such that the slot and the free end can be easily aligned.]

The drive mechanism is mounted on support 870, which has a counter torque 860 that causes the stored energy in the drive mechanism to apply a torque to the clamp rather than the drive mechanism rotating about the clamp.

In this particular case, the counter rotation 860 is shown as a wheel that is intended to ride along at least one edge of the container 120 and any remaining adhesive 110 (or along a raised support structure not shown). The counter rotation need not necessarily be a wheel and could simply be a contact surface that is able to slide along at least one edge of the container 120 and any remaining adhesive 110 (or along a raised support structure not shown). The wheel advantageously provides reduced friction and reduces the torque that the drive mechanism must supply to not only overcome the force required to separate the lid but also any friction that is a part of the system and must be overcome in order for the clamp to move in the direction 310 of the opposite end of the lid.

The counter rotation need not necessarily be on the side 880 of the clamp 140-3 of which the lid will have already been removed. The counter rotation could also have been on the opposite site. However, in that particular case, rather than it being a contact surface, the counter rotation would need to be to be either a weighted object that used gravity to provide a counter rotation or, if available, used an external support structure to provide counter rotation.

It also anticipated that the counter rotation may also be internal to the clamp itself. For example, a fly wheel mechanism could provide the counter rotation and be incorporated along with the drive mechanism as part of an internal support structure within the clamp. The important aspect being that the support structure is able to provide a counter rotation such that the drive mechanism is able to apply a torque to the clamp, not the particular type or location of counter rotation that may be used.

In FIG. 8, for ease of illustration, the drive mechanism was shown as a indirect drive system; however, those of ordinary skill could implement a direct drive system without a rigorous explanation being set forth. Similarly, the drive system is shown as storing and releasing the energy stored in a spring 825 in order to provide torque. Similarly, those of ordinary skill could implement other drive systems such as a magnetic, electrostatic, piezoelectric or liquid/air driven motors with a corresponding energy supply. The motor itself can take on numerous forms for example an induction, stepper, synchronous, torque, brushless, doubly fed electric, pancake, axial rotor, servo or linear to name just a few. The importance being the ability supply sufficient torque to the clamp and not the particular type of drive mechanism.

The switch 852 is represented schematically and can take on many forms depending on the particular application. For example, as an aid to people with disabilities, who lack the physical strength to remove the lid, the switch might be a simple push button or toggle switch. In other application, it might be a motion activated switch, such that when the pet is detected in close proximity to the food container the lid will be removed. In still other applications the switch may be timer controlled and be activated at a specific time or after a pre-determined delay. In still other applications the switch might be either a wired or wireless internet activated switch, which may also include a web cam, that a remote user can potentially use to view/interact with their pet while feeding.

The important aspect being the ability to initiate the application of the drive mechanism applying a torque when desired for a specific application, not the particular type of switch or protocol that may be used.

FIG. 8 also includes an optional cover 890, which is shown as hinged 895 in order to provide easy access to for both insertion/removal of the lid but could also be removable. The use of a cover advantageously hides the removed lid, which may potentially have some food remains upon it.

FIG. 9A-G shows, in simplified form, additional configurations based upon the teachings within.

Figure 9A:
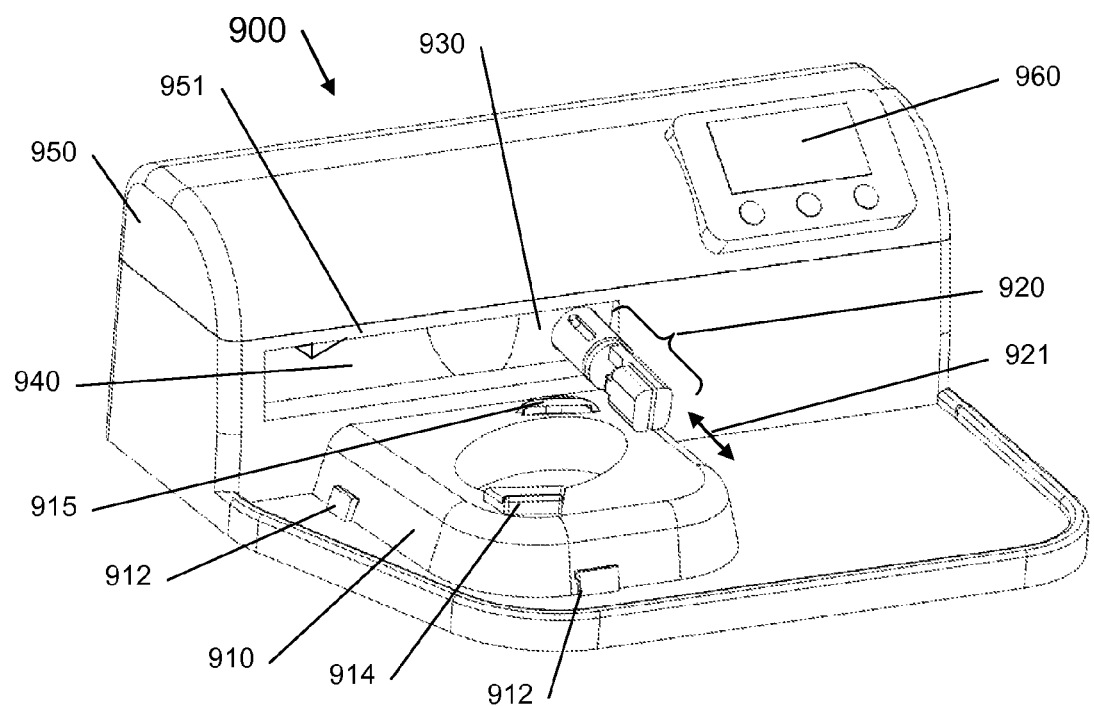
FIG. 9A-G shows, in simplified form, additional configurations based upon the teachings within.

FIG. 9A shows an assembly 900 with a detachable container holder 910 installed, a clamp 920, a drive mechanism 930, a support structure 940 that is partially viewable through a window 951 of cover 950, and a timer 960.

The container holder 910 is shown as detachable using snap clips 912 but could also be attached by screws, nuts and bolts, or other not permanent means of attachment such as hook and loop fasteners. Alternately, the container holder could be permanently attached or manufactured as part of the cover itself. A detachable holder advantageously allows varying container sizes and shapes to be accommodated by the use of an appropriately designed container holder.

The container holder 910 is shown with a movable retainer 914 and a fixed retainer 915, such that by sliding the retainer 914 away from the fixed retainer 915 a food container may be inserted and then secured underneath the two retainers 914, 915.

Figure 9B:
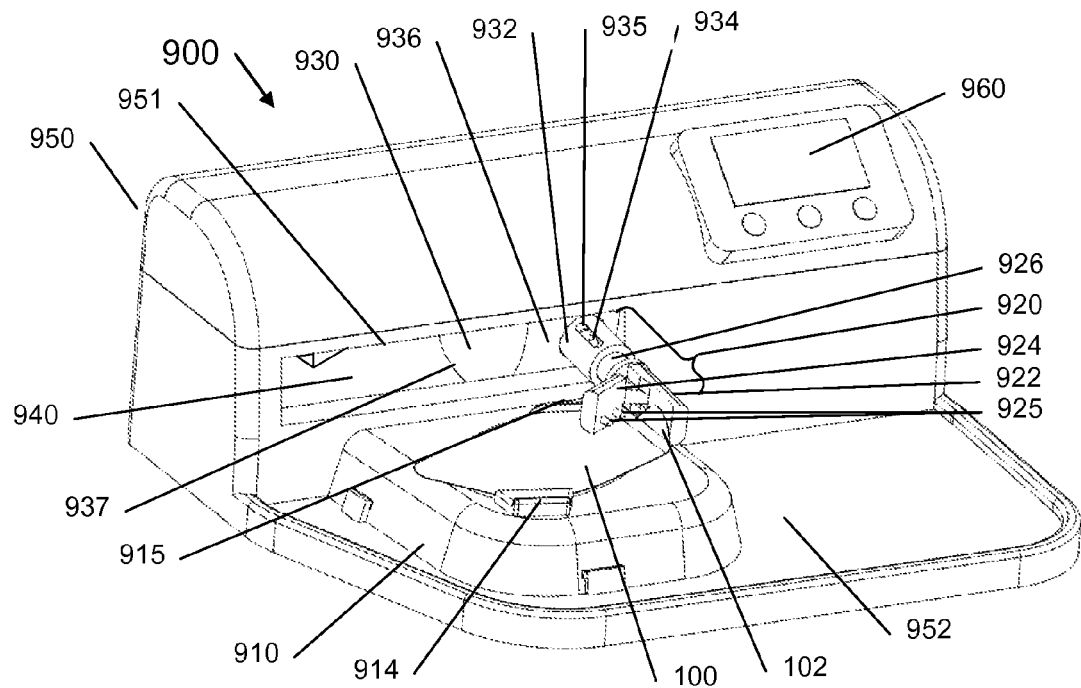
Figure 9C:
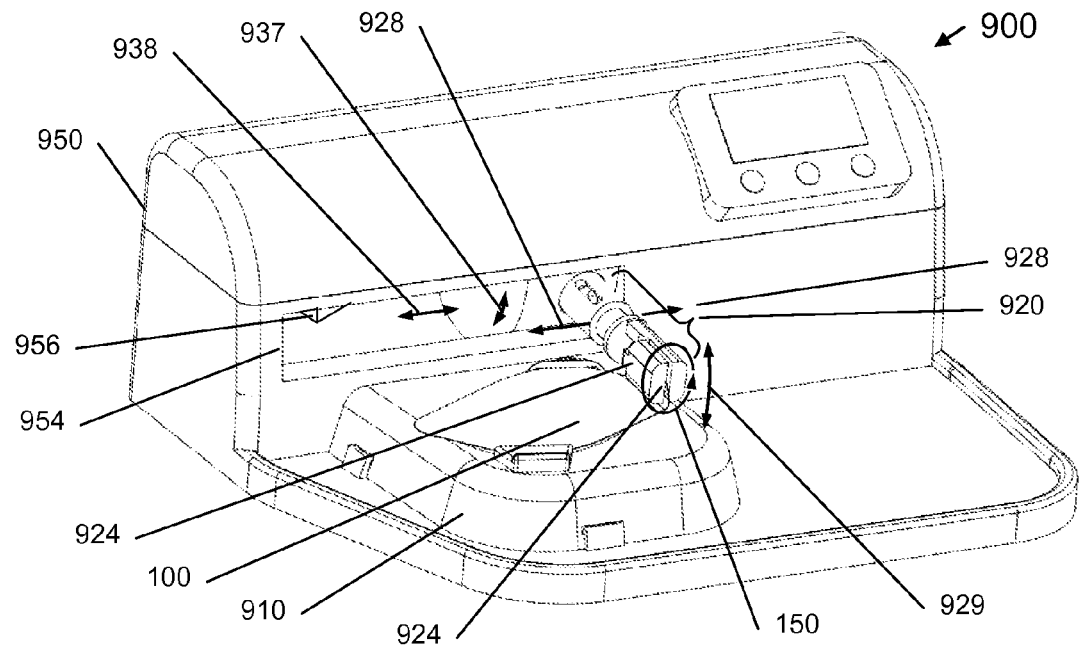

In FIG. 9B a container of food covered by the lid 100 has already inserted into the container holder 910, with the free end of the lid inserted into a clamp 920, ready to be closed.

The clamp 920 is illustrative of the type of clamp that may be used; however, it bears repeating that the important aspect being that the free end 102 of the lid 100 remain within the clamp during rotation and not the particular type of clamp that is used. The clamp 920 has a fixed half 922 and a hinged half 924 with pins 925 that are designed to pierce the free end 102 of the lid 100 when the hinged half 924 is closed (see FIG. 9C).

The clamp 920 is connected to a drive mechanism 930, through a telescoping connector 932. As specified, in respect to FIG. 8, the importance being the ability of the drive mechanism 930 to supply sufficient torque to the clamp and not the particular type of drive mechanism (direct, indirect, and/or ratcheted).

The clamp 920 is shown as being able to move slidably in a direction 921 (see FIG. 9A) that is either towards or away from the drive mechanism and the telescoping part of the clamp 926 is constrained from being removed by a pin 934 sliding within a slot 935. A telescoping clamp advantageously allows varying container configurations to be accommodated. However, non-telescoping configurations are also anticipated as well as removable clamp configurations. An example of a removable clamp configuration is one in which the slot 935 has been opened up at the end furthest away from the drive mechanism 930 such that the clamp can slide completely out or the pin 934 could be spring loaded such that it can be recessed in order to remove the clamp.

Drive mechanism 930 has a curved surface 936 and is designed to move slidably in a support structure 940 that has a matching curved surface to the drive mechanism's curved exterior 937, which is partially viewable through the window 951 of the cover 950. The drive mechanism can move in both a rotational direction 937 and a linear direction 938. Being able to move in both these direction means that the clamp also has a degree a freedom that is in a direction 928 across the lid and also a degree of freedom that allows it move in a direction 929 that either towards or away from the container.

As noted in FIGS. 3A and 3B, when the clamp initially begins to rotate it will move in a direction towards the container until either it contacts part of the support structure that prohibits it from moving all the way towards the container or it will be pulled onto the lid as the slack in the free end 102 of the lid is taken up.

As the clamp 920 moves across the lid, assuming it is not constrained by the support structure, then as successive layers of the lid 100 are wrapped around the clamp, then the clamp as discussed in relationship to FIG. 5 will move in a direction that is away from the container. If the clamp 920 is constrained by the support structure then it will function as specified in relation to FIG. 7 and movement in the direction 929 that is either towards or away from the container is not required as long as there is sufficient clearance for the lid to wrap completely around the clamp.

The rotation 150 of the clamp is initiated by the timer 960 activating the drive mechanism to supply the required torque to remove the lid. Once activated the clamp will move across the lid 100 from the free end 102 to the opposite side until one or more of the following occurs: the lid has been removed; it reaches a physical limit, such as a housing wall 954; or the clamp or drive mechanism comes into contact with a deactivation device, such as a switch 956. Other options for controlling the clamp rotation include one or more of the following: a predetermined time interval of activation; a specified number of revolutions, using a stepper motor or an encoder (not shown), turning off the drive mechanism once the lid has been removed, which includes measuring and monitoring the applied torque, optically determining that the lid has been removed by using sensors (not shown) to detect a visual gap between the container and the lid, or eclectically determining that the lid has been removed by using sensors (not shown) to determine that there is an electrical gap between the container and lid (i.e. a capacitive charge could be applied to the container that is subsequently transmitted to the lid and detected through the clamp).

In this regard, it should be understood that the techniques specified above are representative of the techniques for controlling/limiting clamp rotation are presented for purposes of understanding. It is to be understood that other techniques for controlling/limiting clamp rotation can be used to the same or similar effect. Again, the important aspect being the ability to control/limit clamp rotation, not the particular technique, system, or protocol used.

Figure 9D:
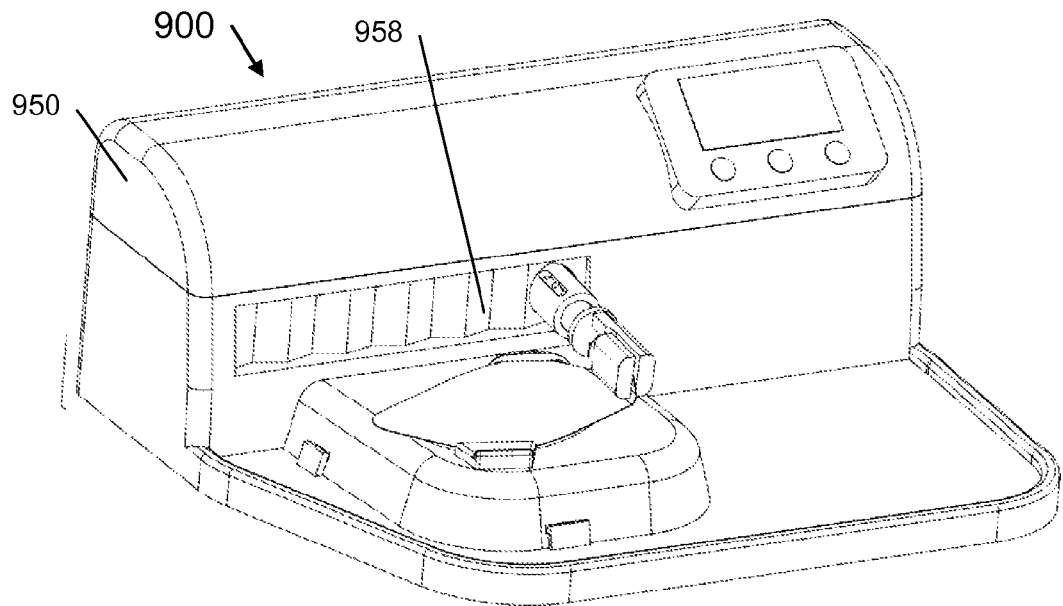

FIG. 9D shows the addition of a safety shield 958 to protect an end user.

In FIG. 9B a catchment area 952 is shown, which advantageously catches food particles in the event that the pet is a messy eater. The catchment area 952 is shown as asymmetric, to illustrate the use of an alternate container holder but could be any desired configuration that is able to retain food particles.

While the container holder can take many forms, an optional feature is to include a closeable cover that will prevent the pet from being able to eat the food after a certain amount of time has passed (i.e. the food spoils after being left open to the air after a specific amount of time) or possibly to prevent another pet equipped with a transponder from eating the food by closing the cover when the other pet is nearby based upon detection of its transponder.

Figure 9E:
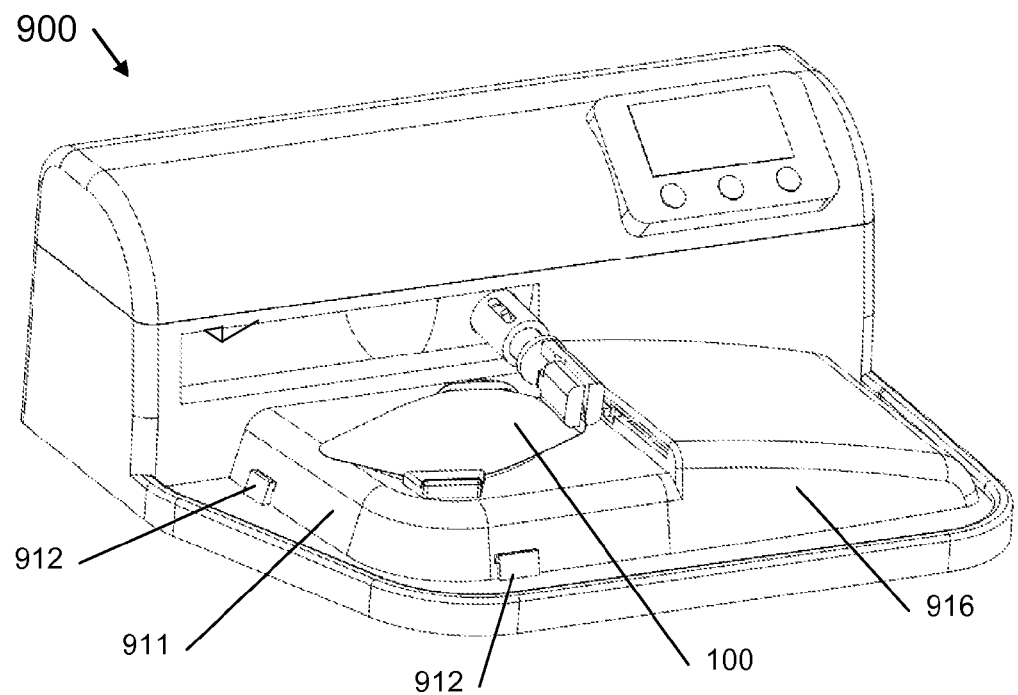
Figure 9F:
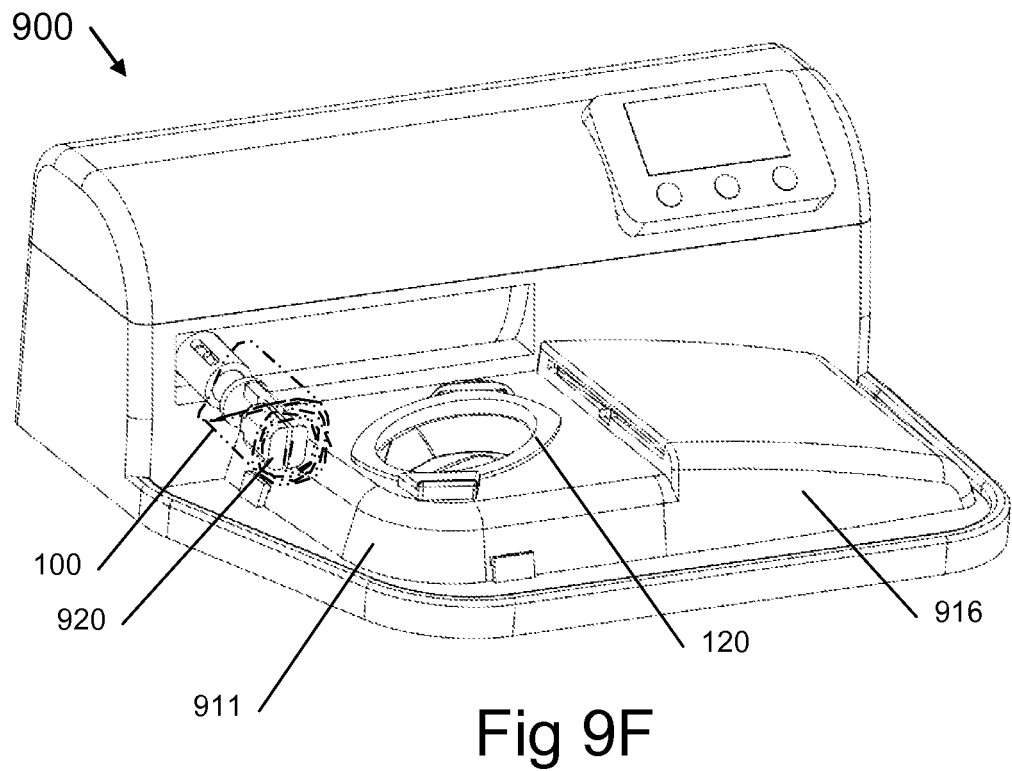
Figure 9G:
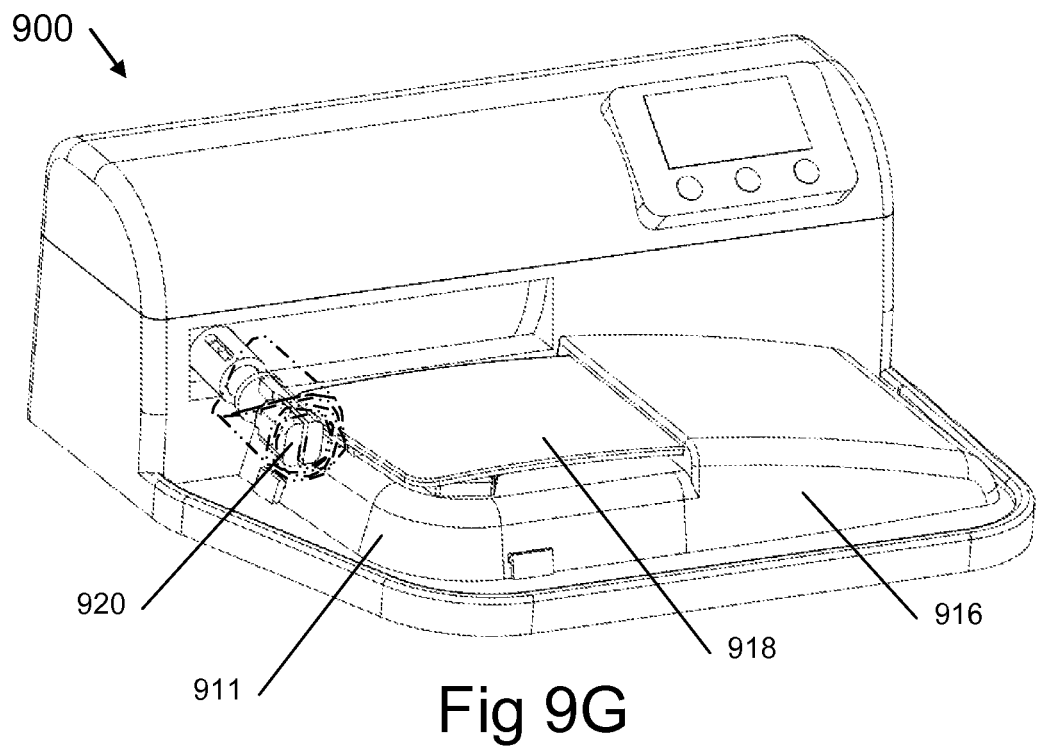

If FIG. 9E the container holder 910 has been replaced with a container holder 911 with an extendable cover, located within a holder extension 916, and is ready for lid removal to begin.

In FIG. F, the lid 100 (drawn in phantom lines) is shown as having been removed from container 120 and wrapped around the clamp 920, which is at its end position.

In FIG. G the closable cover 918 is shown as covering the food such that a pet cannot have access to it. While the cover, as shown, could be extended using a linear drive, other covers such as ones that fold over top or an aperture type closing mechanism are also anticipated. The important aspect being that the closable cover prevents the pet from accessing the food, not the particular type of cover that may be used.

Additional features anticipated include a handheld vacuum, which may or may not be integrated, to aid in food particle cleanup and/or food container storage compartments.

While the focus has been on opening pet food containers it should understood that various different variants of the invention are equally applicable to opening any product with a peelable lid such as human food (yogurt, TV dinners), beverages, hospital sterilization units, household items (light bulbs, adhesives, paper products), medical devices, personal & home care products, pharmaceuticals, tobacco products, as well as other consumer and industrial packaging.

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed is:

1. A pet food lid removal system comprising:
   a clamp configured to constrain a free end of a lid of a container, to travel in a first direction that is from the free end of the lid to the opposite end of the lid, and to remove the lid by having it wrap around the clamp; and
   a drive mechanism coupled to a first support structure and configured to apply a torque to the clamp that is sufficient to overcome the force required to separate the lid from the container and to cause the clamp to rotate.

2. The pet food lid removal system of claim 1 wherein the clamp is further configured to have at least two degrees of freedom represented by two orthogonal directions where one direction is the first direction and the other direction is one or more of either towards or away from the container.

3. The pet food lid removal system of claim 1 wherein the clamp is configured to have at least one degree of freedom in the first direction and further comprising a second support structure configured to restrict the clamp from moving in a second direction that is towards the container and orthogonal to the first direction.

4. The pet food lid removal system of claim 1 wherein the clamp is motion actuated.

5. The pet food lid removal system of claim 1 wherein the clamp is configured to constrain the free end of the lid by piercing it.

6. The pet food lid removal system of claim 1 wherein the clamp is configured to be rotatable in a direction that is opposite of the torque applied by the drive mechanism.

7. The pet food lid removal system of claim 1 further comprising a container holder configured to constrain the container's movement such that the container will not move in one or more of the following directions: towards the clamp or that follows the clamps direction of motion when the lid is being removed.

8. The pet food lid removal system of claim 1 further comprising a powered cover that is configured to prevent access to the container.

9. The pet food lid removal system of claim 1 further comprising a switch configured to control the application of torque by the drive mechanism to the clamp.

10. The pet food lid removal system of claim 9 further comprising a timer configured to accept input from a user and to activate the switch based upon the user's input.

11. The pet food lid removal system of claim 9 further comprising a catchment area, whereby food particles that may fall during eating are able to be contained.

12. A pet food lid removal system comprising:
a clamp configured to constrain a free end of a lid of a container, to travel in a direction that is from the free end of the lid to the opposite end of the lid, and to remove the lid by having it wrap around the clamp; and
a drive mechanism coupled to a first support structure and configured to apply a torque to the clamp to cause the clamp to rotate and to overcome the force required to separate the lid from the container.

13. The pet food lid removal system of claim 12 further comprising a second support structure configured to restrict the clamp's movement in a direction that is towards the container.

14. The pet food lid removal system of claim 12 further comprising a container holder configured to constrain the container's movement such that the container will not move in one or more of the following directions: towards the clamp or that follows the clamps direction of motion when the lid is being removed.

15. A pet food lid removal method comprising:
constraining a free end of a lid of a container in a clamp;
activating a drive mechanism to apply a torque to the clamp that is sufficient to overcome the force required to separate the lid from the container and to cause the clamp to rotate; and
rotating the clamp using torque supplied by the drive mechanism such that the clamp travels from the free end of the lid to the opposite end while the lid is wrapped around the clamp.

16. The pet food lid removal method of claim 15 wherein the constraining is the result of activating the drive mechanism to apply a torque.

17. The pet food lid removal method of claim 15 further comprising turning the clamp opposite the direction of the torque applied by the drive mechanism such that the free-end of the lid and the clamp are advantageously aligned.

18. The pet food lid removal method of claim 15 further comprising constraining the container using a container holder such that the container will not move in the one or more of the following directions: towards the clamp or that follows the clamps direction of motion when the lid is being removed.

19. The pet food lid removal method of claim 15 further comprising receiving input through a timer that specifies when the activating should occur and initiating the activation at the specified time.

20. The pet food lid removal method of claim 15 extending a cover to prevent access to the container after a specified time interval.

* * * * *